United States Patent [19]

Zibell et al.

[11] Patent Number: 4,588,502

[45] Date of Patent: May 13, 1986

[54] SIEVE DEVICE FOR CLEANING MOLTEN PLASTICS

[75] Inventors: Bodo Zibell, Porta Westfalica; Hubert Patrovsky, Löhne; Detlef Gneuss, Bad Oeynhausen, all of Fed. Rep. of Germany

[73] Assignee: Detlef Gneuss, Bad Oeynhausen, Fed. Rep. of Germany

[21] Appl. No.: 647,929

[22] Filed: Sep. 6, 1984

[30] Foreign Application Priority Data

Dec. 6, 1983 [DE] Fed. Rep. of Germany ....... 3344002

[51] Int. Cl.$^4$ .............................................. B01D 35/12
[52] U.S. Cl. ..................................... 210/171; 210/391; 425/199
[58] Field of Search ................. 210/171, 391; 425/199, 425/197, 198

[56] References Cited

U.S. PATENT DOCUMENTS

| 2,765,085 | 10/1956 | Strindlund | 210/391 |
| 3,146,494 | 9/1964 | Sponaugle | 425/199 |
| 3,269,611 | 8/1966 | Komarek | 425/197 |
| 4,025,434 | 5/1977 | Mladota | 425/197 |
| 4,167,384 | 9/1979 | Shirato et al. | 425/199 |

FOREIGN PATENT DOCUMENTS

| 0114651 | 1/1984 | European Pat. Off. | 425/197 |
| 1554913 | 1/1971 | France | 425/197 |

Primary Examiner—Tim Miles
Attorney, Agent, or Firm—Sprung Horn Kramer & Woods

[57] ABSTRACT

Sieve device for cleaning molten plastics in conjunction with a high-pressure press and consisting of a housing with a flow-through bore that constitutes part of the flow channel of the high-pressure press and of a plate or disk that can be displaced or rotated in the housing and that has several perforations or sieve chambers, at least one of which is always in the vicinity of the flow channel and at least one of which is always outside the housing, whereby either a sieve disk is always positioned inside the flow channel or sieve disks are positioned inside the perforations. At least one perforation is always inside the housing but outside the flow channel and can be evacuated before entering the flow channel by a suctioning-out pump or similar device. The sieve chambers are all separated from one another by curved webs, with the surface of one web equal to about 10% or less of the overall surface of one sieve chamber.

2 Claims, 13 Drawing Figures

SIEVE DEVICE FOR CLEANING MOLTEN PLASTICS

BACKGROUND OF THE INVENTION

The present invention relates to a sieve device for cleaning molten plastics.

A sieve device for cleaning molten plastics in conjunction with a high-pressure press and consisting of a housing with a flow-through bore that constitutes part of the flow channel of the high-pressure press and of a plate or disk that can be displaced or rotated in the housing and that has several perforations, at least one of which is always in the vicinity of the flow channel and at least one of which is always outside the housing, whereby either a sieve disk is always positioned inside the flow channel or sieve disks are positioned inside the perforations is in itself known.

The perforations in the plate or disk that can be displaced or rotated in the housing of sieve devices of the generic type are in accordance with the purpose for which the device is intended introduce alternately into the flow channel of the high-pressure press.

Every time a new perforation enters the vicinity of the flow channel the pressure conditions that the molten plastic is subject to changes because the air in the perforation entering the flow channel has to be compressed by the molten plastic. This necessity has also always led in unfavorable conditions to the formation of bubbles in the molten plastic because part of air in the perforation gets included in the plastic.

SUMMARY OF THE INVENTION

The object of the present invention is to thoroughly improve a sieve device of the generic type to the extent that continuity of the molten plastic is optimally maintained when a perforation enters the flow channel.

This object is attained in accordance with the invention in that at least one perforation is always inside the housing but outside the flow channel and can be evacuated before entering the flow channel by a suctioning-out pump or similar device.

This design ensures that the entry of a perforation into the vicinity of the flow channel can provoke practically no disturbances of the molten plastic even from the aspect of pressure engineering in that air gets enclosed in the molten plastic. This is because a perforation entering the flow channel has been practically evacuated and can be loaded, flooded that is, with molten plastic with no perceptible increase in pressure. The perforation being practically free of air also excludes the inclusion of air bubbles in the molten plastic.

The object of preventing the pressure in the molten plastic from increasing while a sieve is being exchanged is attained in accordance with the invention in a sieve device for cleaning molten plastics in conjunction with a high-pressure press and with a rotating sieve disk with its center outside the flow channel of a worm press and with at least two sieve chambers.

The pressure increases in known sieve devices because, since there are relatively large empty spaces between the individual sieve chambers, replacing a dirty sieve with a clean one must be done all at once, leading to a change in pressure in the flow of materials, or so that as the sieve disk continues to rotate the empty spaces that inhibit the flow remain for a certain amount of time in the flow channel and, since the empty spaces between the sieve chambers account for about 30% of the overall surface of the sieve, this can lead to malfunction and changes in pressure.

The object in accordance with the invention of preventing the pressure in the molten plastic from increasing, especially while the sieves are being interchanged, is attained in that the sieve disk 40 has an annularly positioned sieve zone, inside of which the sieve chambers are all separated from one another by curved webs 80, with the surface of one web equal to 10% or less of the overall surface of one sieve chamber.

The diminished surface of the webs between the individual sieve chambers prevents practically any increase in pressure in the molten plastic while a sieve is being interchanged. The relatively small area of the individual webs in terms of the overall surface of the chambers can be practically neglected while the sieves are being interchanged.

The chambers that are not in the flow channel are freely accessible over a wide angle of the sieve disk and can accordingly be cleaned while they are not in the vicinity of the flow channel. It is unnecessary to interrupt operations for cleaning or sieve replacement.

A further object of the present invention is a sieve for a sieve device for cleaning molten plastics in conjunction with a high-pressure press and with a rotating sieve disk with its center outside the flow channel of a worm press and with at least two sieve chambers.

A sieve in accordance with the invention is characterized in that it has a bottom surface that is annular and is demarcated on the front by lines that curve in the same direction.

Other characteristics of the invention will be evident from the following.

Some preferred embodiments of the invention will now be described with reference to the attached drawings, wherein

DETAILED DESCRIPTION OF THE PREFERRED EMBODIMENTS

Figure 1:
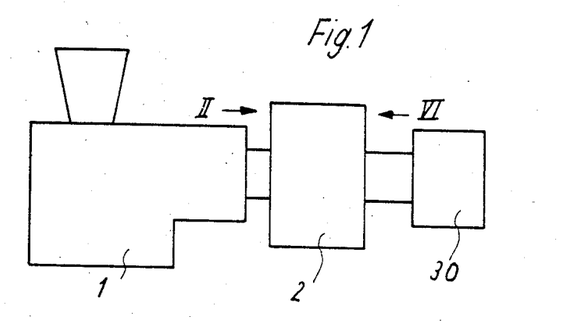
FIG. 1 is a schematic illustration of a high-pressure press with a tool downstream of its sieve device.

Plastic is plastisized in a way that is in itself known in the high-pressure press 1 illustrated in FIG. 1 and conveyed through a sieve device 2 in which it is cleaned.

The cleaned molten plastic is then conveyed from sieve device 2 to a tool 30.

Figure 2:
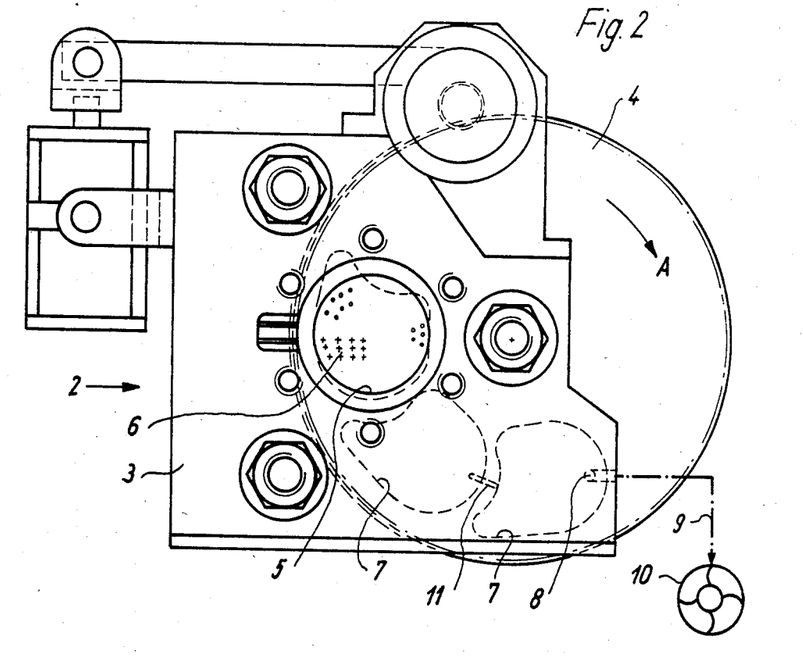
FIG. 2 is a view of the sieve device in the direction indicated by arrow II in FIG. 1.

FIG. 2 is a view of the sieve device in the direction indicated by arrow II in FIG. 1.

Sieve device 2 consists essentially of a housing 3 and of a disk 4 mounted inside it in such a way that it can rotate.

A flow-through bore 5 that constitutes part of the flow channel of high-pressure press 1 is positioned inside housing 3. A sieve disk 6 is positioned in flow-through bore 5.

Disk 4 has several perforations 7. Although FIG. 2 illustrates only the perforations 7 that are inside housing 3, the disk has them at equal intervals spaced apart all the way around it. Thus, a certain number of perforations 7 are always inside housing 3 when a certain number of perforations are in the area of disk 4 which is outside housing 3.

Disk 4 is, as previously mentioned mounted in such a way that it can rotate inside housing 3. Rotating disk 4 moves perforations 7 in constant alternation into the vicinity of flow-through bore 5.

As previously indicated herein the sieve 6 in the embodiment illustrated in FIG. 2 is inside flow-through bore 5 downstream of the disk 4 and perforations 7 in the direction of flow of the plastic. The perforations 7 of disk 4 entrain contaminants as perforations through housing 3 upstream of sieve 6 and help to clean sieve 6.

FIG. 2 illustrates a situation involving a perforation 7 in the vicinity of flow-through bore 5. Disk 4 rotates in the direction indicated by arrow A. As the disk rotates, perforation 7, which is still outside flow-through bore 5 as illustrated in FIG. 2, will arrive at some time or other in the vicinity of the bore. The molten plastic passing through flow-through bore 5 must now fill up the area of the entering perforation 7. This filling action is facilitated by the design that will now be described.

Inside housing 3 and in the flow-through area of perforation 7 is a suctioning-off bore 8 that communicates with a suctioning-out pump 10 through a line 9. The pump evacuates every perforation 7 before the perforation arrives in the vicinity of flow-through bore 5.

The suctioning-off bore 8 is so far away from flow-through bore 5 that another perforation 7, which has already been evacuated, is between the perforation 7 to be evacuated and flow-through bore 5. Inside housing 3 there is also an overflow channel 11 that hydraulically connects the two perforations 7 lying in front of flow-through bore 5 even when the perforation 7 that lies immediately in front of flow-through bore 5 enters the vicinity of flow-through bore 5. Consequently, air will be suctioned out of perforation 7 in a practical way even while the perforation is entering flow-through bore 5. The molten plastics entering perforation 7 will accordingly enter the evacuated perforation 7 even more rapidly and easily and will be able to fill it up.

Figure 3:
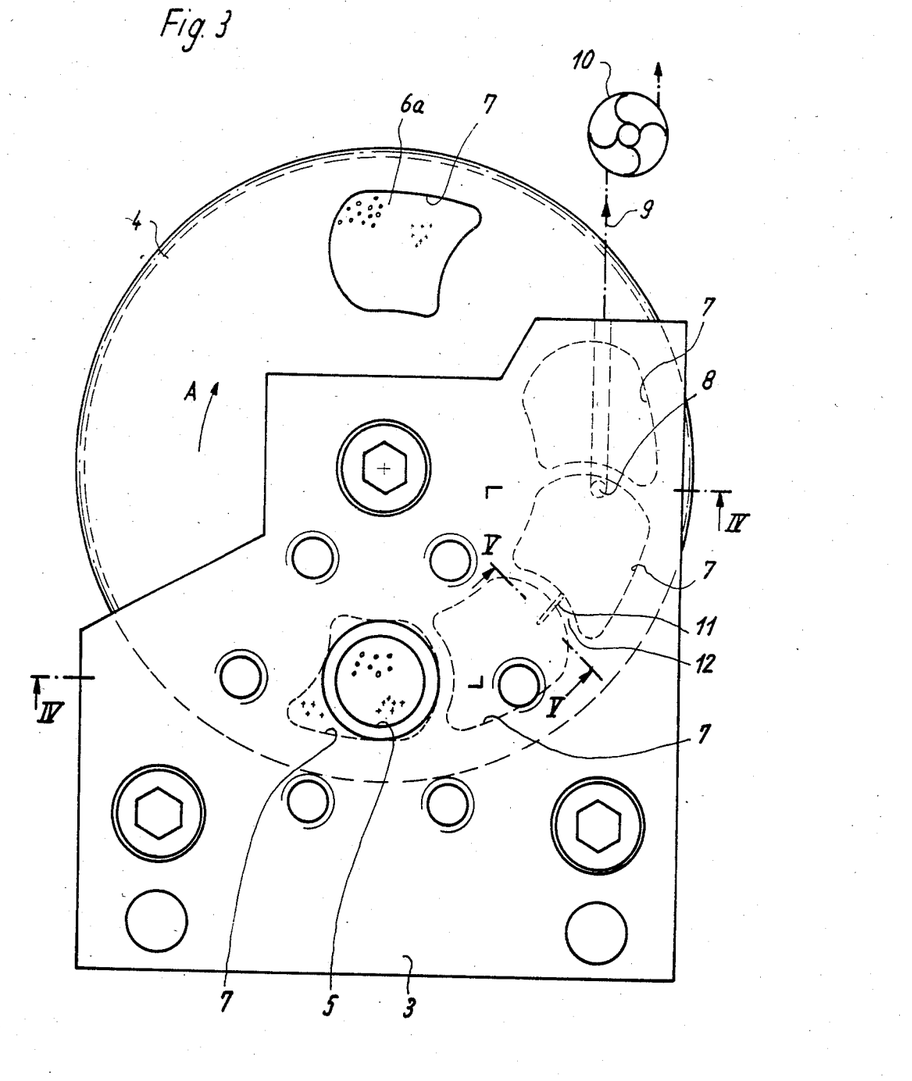
FIG. 3 is a view similar to that in FIG. 2 of a sieve device in accordance with another embodiment of the invention.
Figure 4:
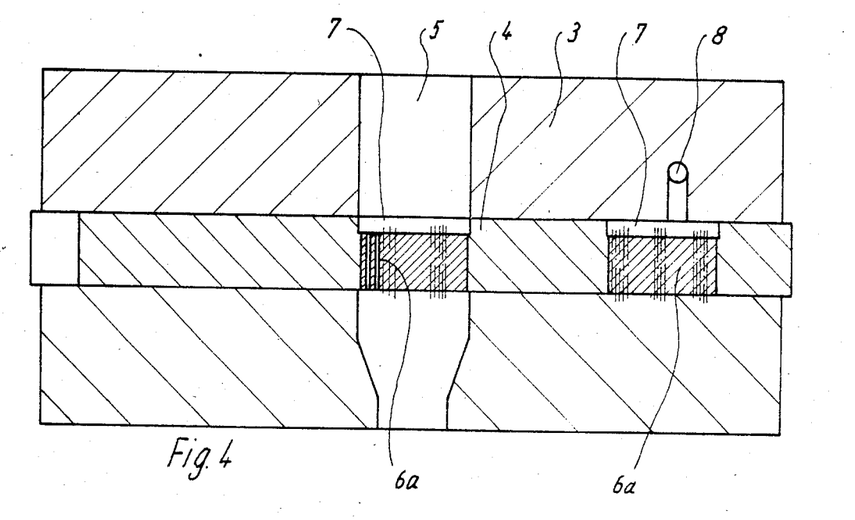
FIG. 4 is a section along line IV—IV in FIG. 3.
Figure 5:
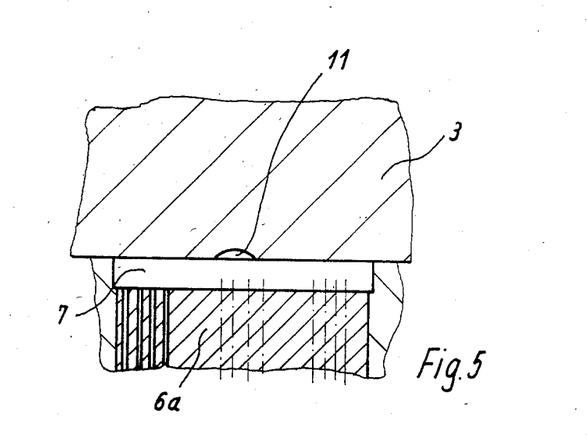
FIG. 5 is a partial section along line V—V in FIG. 3.

The embodiment illustrated in FIGS. 3 through 5 has the same design in principle, including a disk 4 that rotates inside housing 3 in the direction indicated by arrow A. The perforations 7 in the embodiment illustrated in FIG. 3 have sieve disks 6a. Flow-through bore 5, which is again part of the flow channel of high-pressure press 1, is completely open. The individual sieve disks in perforations 7 are moved alternately into the vicinity of flow-through bore 5 by rotating disk 4.

A suctioning-off bore 8 inside housing 3 again communicates with a suctioning-out pump 10 through a line 9.

The perforations 7 in disk 4 in the embodiment illustrated in FIGS. 3 through 5 are also evacuated before entering the vicinity of flow-through bore 5. Suctioning-off bore 8 is also positioned such that the second perforation 7, the perforation lying in front of flow-through bore 5, can be evacuated. An overflow channel 11 inside housing 3 again hydraulically connects the two perforations 7 lying in front of flow-through bore 5.

Overflow channel 11 is at least as long as a web 12 that separates two successive perforations 7.

Figure 6:
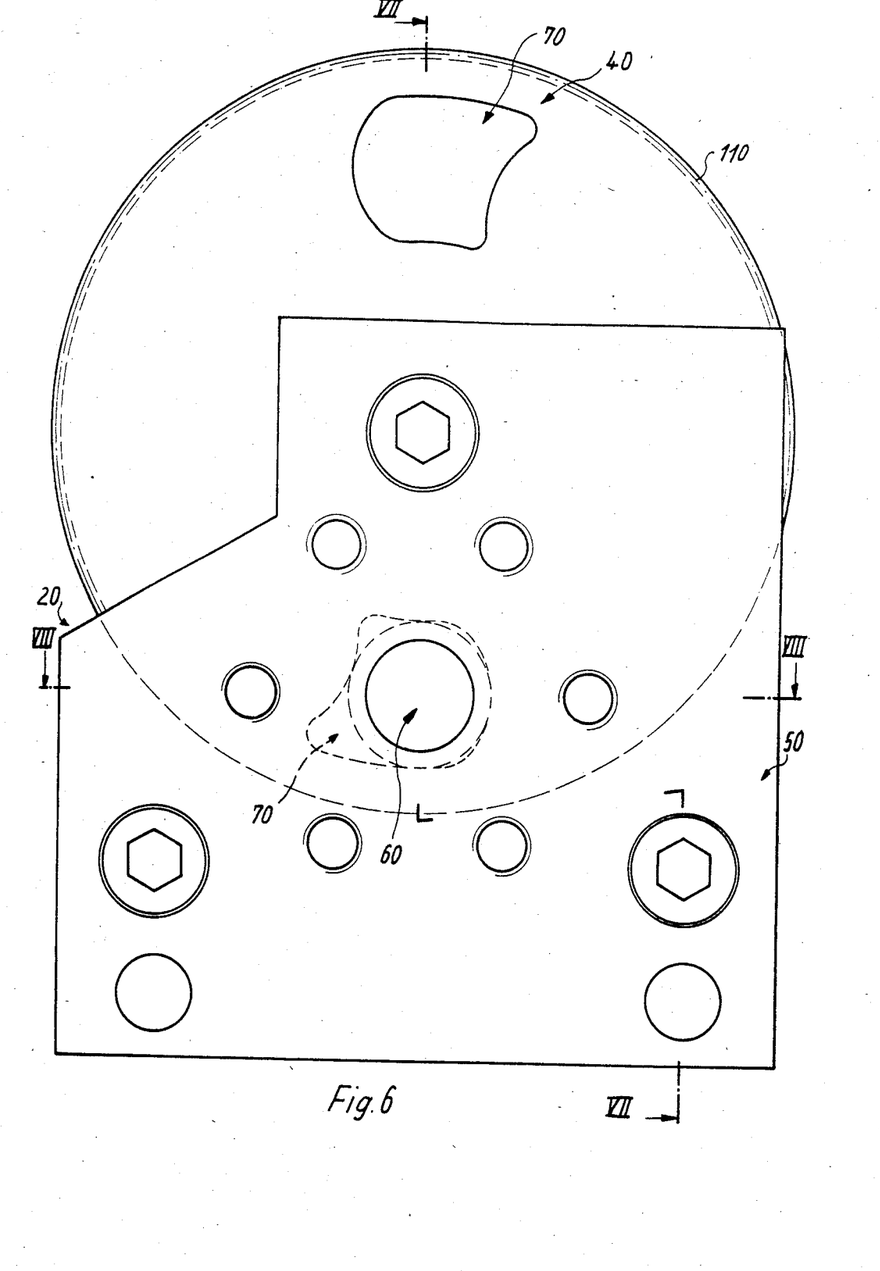
FIG. 6 is a view of another embodiment of the sieve device in the direction indicated by arrow VI in FIG. 1.
Figure 7:
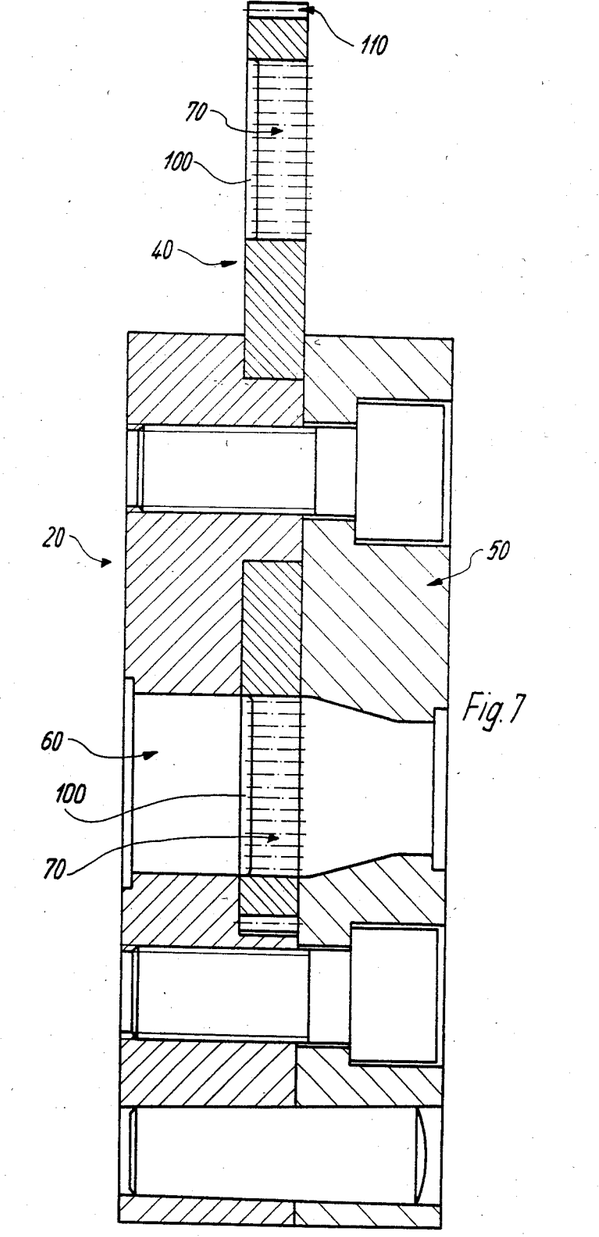
FIG. 7 is a section along line VII—VII in FIG. 6.
Figure 8:
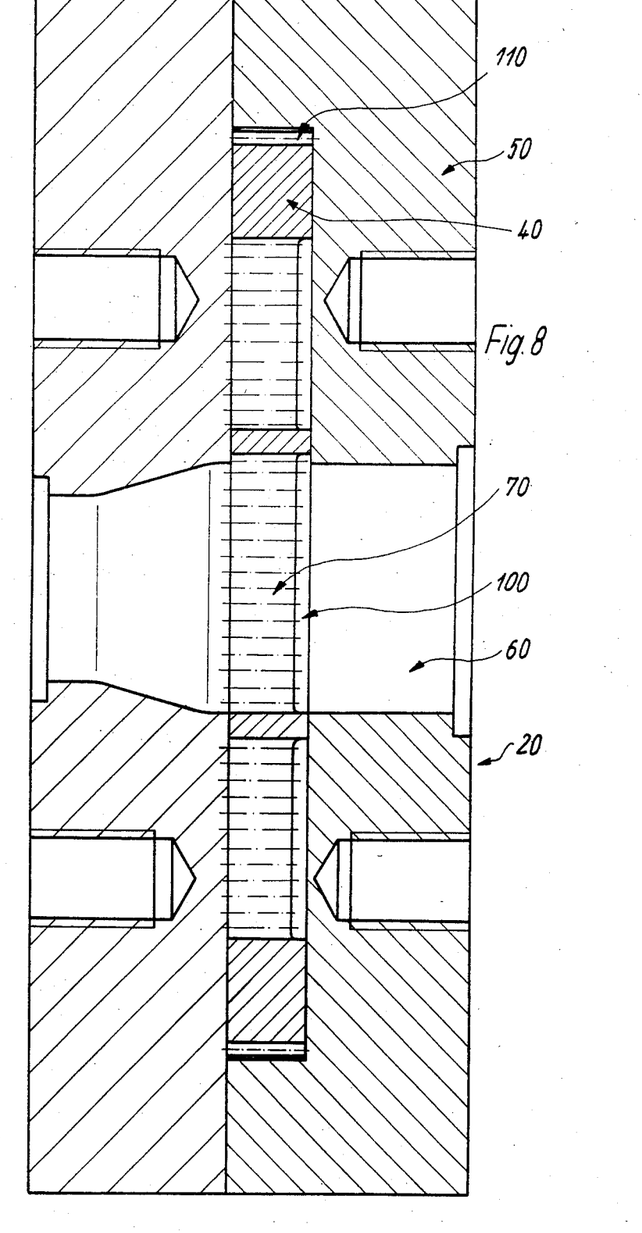
FIG. 8 is a section along line VIII—VIII in FIG. 6.
Figure 9:
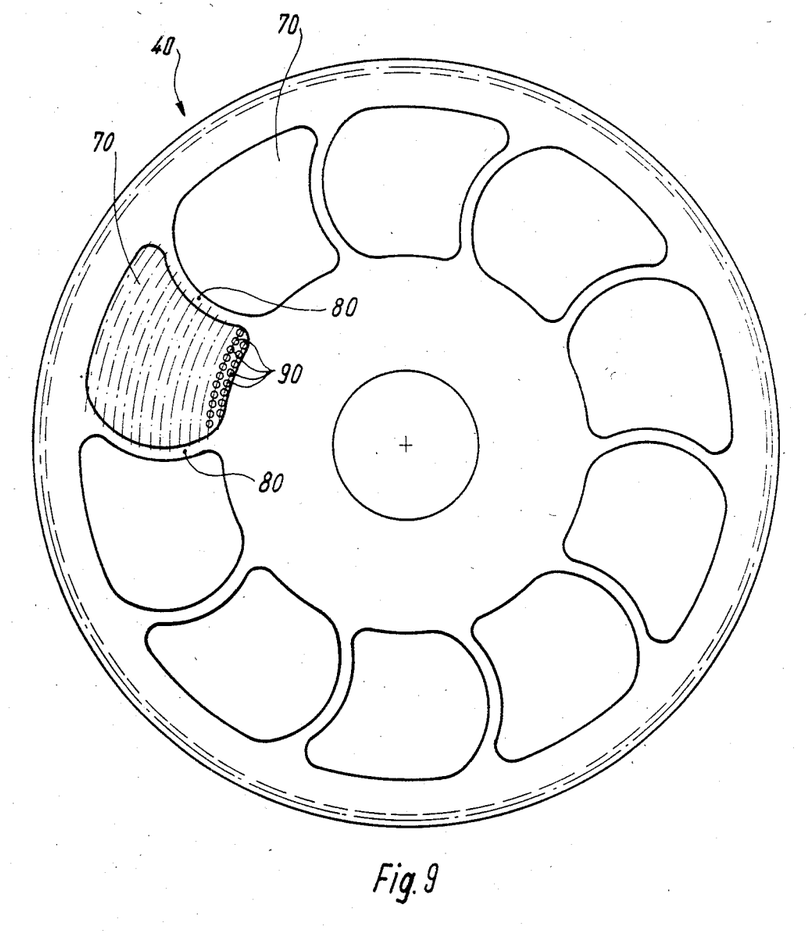
FIG. 9 is a view of a sieve disk for the sieve device illustrated in FIGS. 6 through 8.
Figure 10:
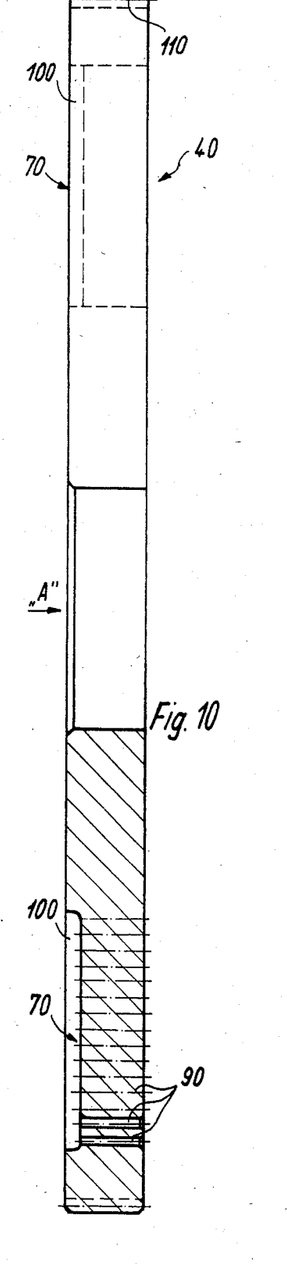
FIG. 10 is a partly sectional side view of the sieve disk in FIG. 9.

The sieve device 20 illustrated in FIGS. 6 through 8 has a sieve disk 40 that is illustrated by itself in FIGS. 9 and 10.

Sieve disk 40 rotates inside a housing 50 that is equipped with part of flow channel 60, which molten plastic can flow through from high-pressure press 1 to tool 30.

Sieve disk 40 is mounted in such a way as to rotate in housing 50 with its center of rotation outside flow channel 60.

Sieve disk 40 has, as will be evident from FIG. 9 in particular, a number of sieve chambers 70 in the vicinity of an outer annular zone. Sieve chambers 70 are separated by narrow webs 80 that curve in the same direction.

The curvature of webs 80 preferably fits into the radius of flow channel 60.

As will be especially evident from FIGS. 9 and 10, sieve disk 40 has a number of flow-through bores 90 in the vicinity of sieve chambers 70 and has a depression 100 on the upstream side. The depressions 100 in sieve chambers 70 are separated by webs 80.

Since the depressions 100 in sieve disk 40 are deeper than the thickness of a sieve or package of sieves that is inserted into the depressions is thick, any particles of dirt that are entrapped while the molten plastics are being cleaned can collect on the sieve or package of sieves without projecting beyond the upstream side of sieve disk 40.

The outer circumference of the sieve disk in the embodiment illustrated in FIGS. 6 through 10 is provided with teeth 110 and the disk can accordingly be continuously driven by a pinion, which is not illustrated in the figures.

Figure 11:
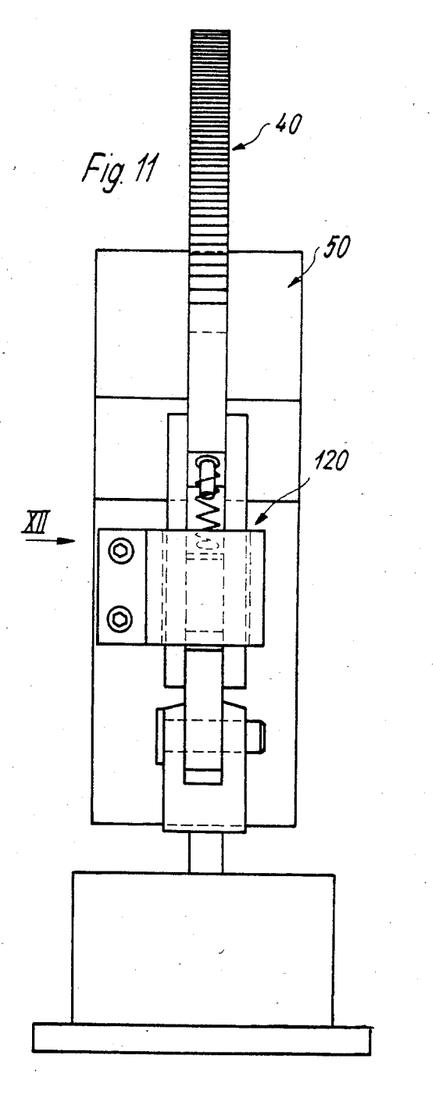
FIG. 11 is a side view of a sieve device in another embodiment of the invention.
Figures 12, 13:
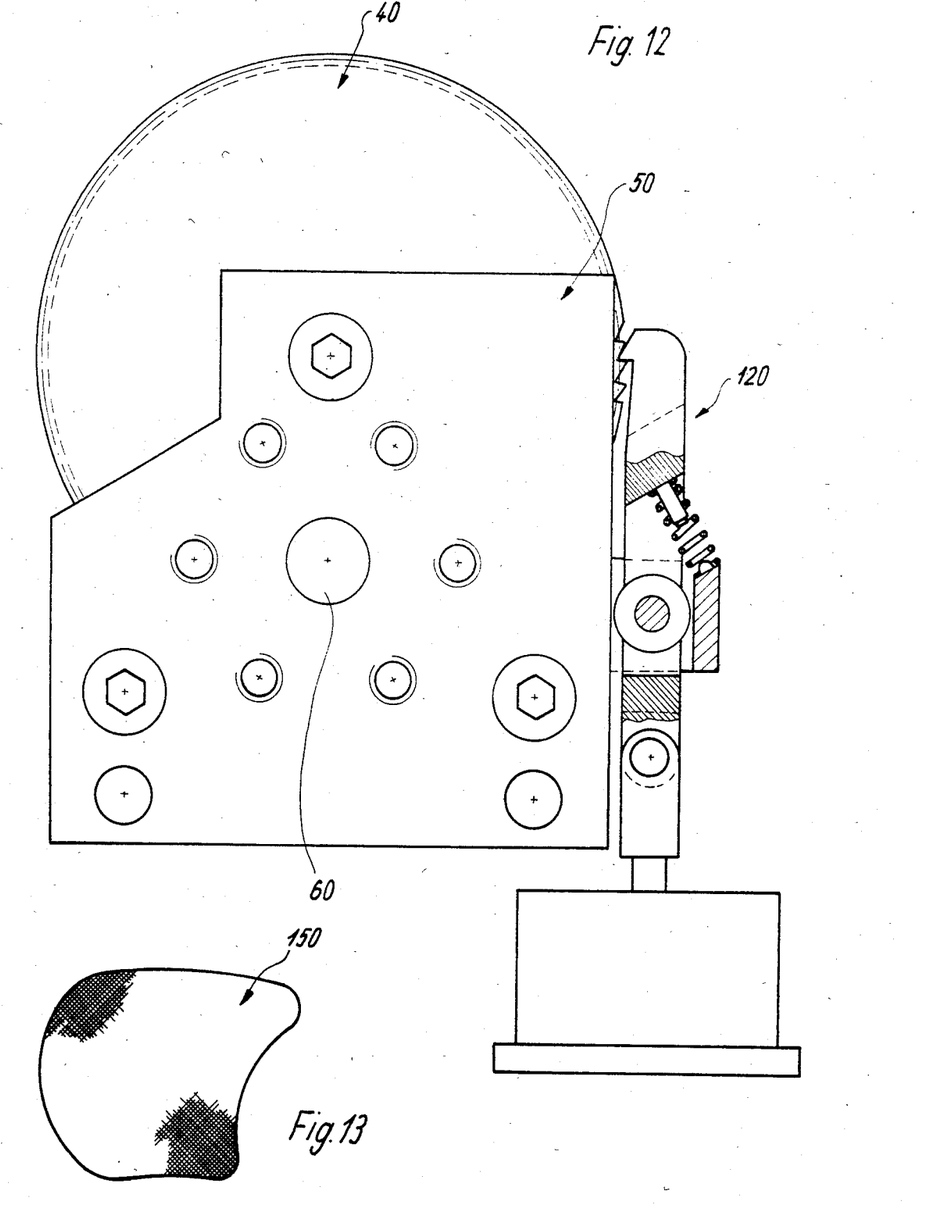
FIG. 12 is a partly sectional view in the direction indicated by arrow XII in FIG. 1.
FIG. 13 is a view of a sieve for a sieve device.

The sieve disk 40 in the embodiment illustrated in FIGS. 11 and 12 is designed at its outer circumference like a ratchet wheel and can be discontinuously driven in small increments by a ratchet drive 120, illustrated in FIG. 12.

The sieve disk 40 in FIG. 6 is for simplicity's sake illustrated with only two schematically drawn sieve chambers 70 because the precise design of the disk will be evident from FIGS. 9 and 10. No sieve chambers at all are illustrated in FIG. 12 because the sieve chambers in the embodiment illustrated in FIGS. 11 and 12 are in principle exactly the same as those in FIGS. 9 and 10.

The mean distance between webs 80 can in a practical way be as much shorter than the diameter of flow channel 60 as a web is wide. Since the total surface of a web 80 will then always lie in the effective flow area no matter what position sieve disk 40 is in, the same pressure conditions will always prevail in flow channel 60.

The base of the sieve 150 in FIG. 13 fits into sieve chambers 70. This means that the base of sieve 150 will be annular and demarcated on the front by lines that curve in the same direction as evident from FIG. 13.

It will be appreciated that the instant specification and claims are set forth by way of illustration and not limitation, and that various modifications and changes may be made without departing from the spirit and scope of the present invention.

What is claimed is:

1. In a sieve device, for cleaning molten plastics supplied from a high-pressure press having an output flow channel, of the type having a housing with a flow-through bore communicatable with the flow channel of the high-pressure press, a plate mounted for displacement with respect to the housing and having several perforations therein, with the plate configured such that at least one perforation is always inside the housing, at least one perforation is always aligned with the flow-through bore, and a sieve disposed in a flow path formed by the flow-through bore and the aligned perforation, the improvement comprising: at least two perforations always inside the housing but outside the flow-through bore, and means for evacuating each perforation which is inside the housing but outside the flow-through bore before said perforation enters the flow-through bore upon displacement of the plate comprising a suctioning-off bore inside the housing and in a flow-through area of a perforation, a suctioning-out pump that communicates with the suctioning-off bore through a line, wherein the suctioning-off bore is spaced apart from the flow-through bore by a distance sufficient to permit one perforation between the perforation that is to be evacuated through the suctioning-off bore and suctioning-out pump and the perforation that is inside the flow-through bore of the housing.

2. The sieve device as in claim 1, further comprising an overflow channel inside the housing that hydraulically connects the perforation directly upstream of the flow-through bore with the perforation in the vicinity of the suctioning-off bore.

* * * * *